Aug. 16, 1966 J. M. BROWNLOW 3,267,443

MAGNETIC MEMORY ELEMENT

Original Filed May 27, 1960

INVENTOR.
JAMES M. BROWNLOW

BY [signature]

ATTORNEY

United States Patent Office 3,267,443

Patented August 16, 1966

3,267,443
MAGNETIC MEMORY ELEMENT

James M. Brownlow, Crompond, N.Y., assignor to International Business Machines Corporation, New York, N.Y., a corporation of New York

Original application May 27, 1960, Ser. No. 32,360, now Patent No. 3,077,021, dated Feb. 12, 1963. Divided and this application July 24, 1962, Ser. No. 212,012

3 Claims. (Cl. 340—174)

This is a division of application Ser. No. 32,360, filed May 27, 1960, and issued on February 12, 1963 as Patent No. 3,077,021.

This invention relates to memory arrays and more particularly it relates to a method of making memory arrays composed of a plurality of high-speed, bistable, open flux path magnetic elements secured on a substrate member.

High speed, open flux path memory elements consist of ferrite or other material in the shape of small rods, bars, fibers, or tubes which have remanence in the plane of the element. Within certain dimensions, in particular, a thickness of less than 25 microns, these open flux path elements exhibit high switching speeds not obtainable previously with conventional thick toroidally shaped ferrite memory elements. Due to their small size these elements are not easily fabricated into large scale memory arrays. Direct attachment to a substrate member has been found to result in contamination of the memory ferrite bits. Individual handling of these bits also presents considerable difficulty.

Accordingly, an object of the present invention is to provide a method of fabricating large scale memory arrays consisting of high-speed open flux path memory elements.

Still another object is to provide a high-speed, open flux path memory array in which the individual memory bits are uncontaminated during their formation.

The foregoing and other objects, features and advantages of the invention will be apparent from the following more particular description of preferred embodiments of the invention, as illustrated in the accompanying drawings.

In the drawings:

FIGURE 1 is a schematic representation of the first step in the process; namely, the step in which a substrate is provided with a layer of a parting sand.

Figure 1:
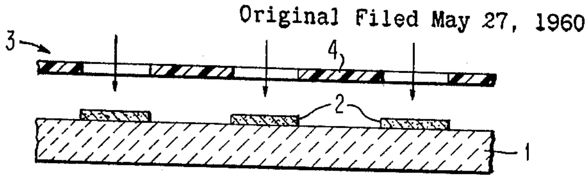
FIGURES 1–3 illustrate the several steps in the method of the present invention.
Figure 1A:
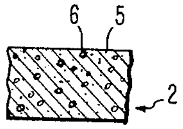

FIGURE 1*a* is a sectional view of the sand composition.

Figure 2:
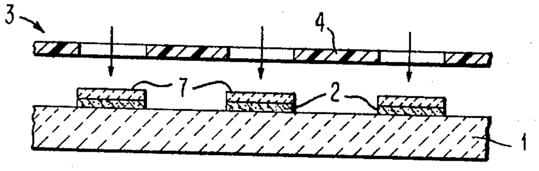

FIGURE 2 shows the positioning of the ferrite layer atop the sand layer.

Figure 3:
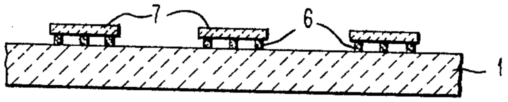

FIGURE 3 depicts the resultant memory array after firing.

FIGURES 4–7 illustrate the steps in forming a tubular bit memory array.

Figure 4:
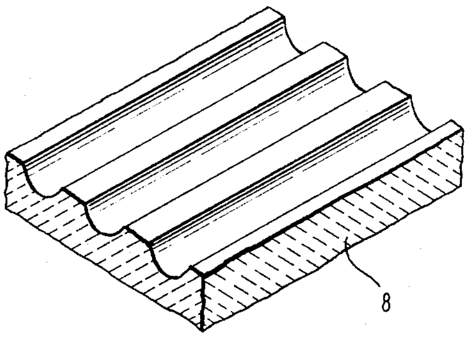

FIGURE 4 shows the substrate structure.

Figure 5:
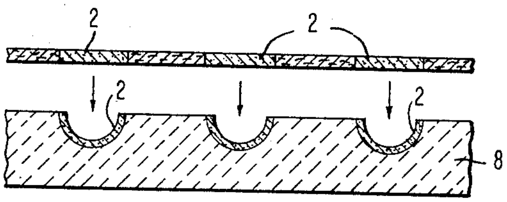

FIGURE 5 shows the sand in place on the substrate.

Figure 6:
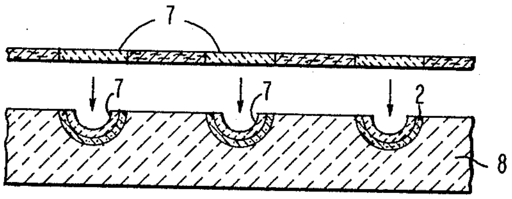

FIGURE 6 shows the ferrite and sand positioned on the substrate.

Figure 7:
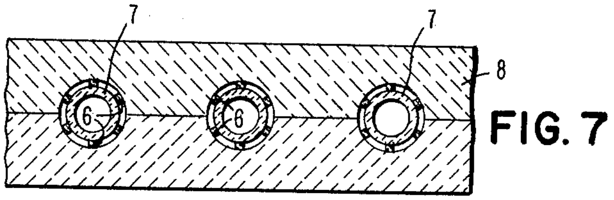

FIGURE 7 shows the fired memory array.

According to the present invention there is provided a method for producing large arrays of high speed, open flux path memory elements wherein the individual memory bits are formed on a non-contaminating substrate. Specifically, the method comprises first providing a substrate member with a parting sand composition comprising a mixture of a combustible organic constituent and a non-volatile inorganic powder, the sand being placed only in the areas where the bits are to be attached. Thereafter the high speed open flux path ceramic ferrite bits, in the form of, for example, thin rectangular slabs, are placed on the sand. Finally the resultant laminated structure is fired at elevated temperatures to form, thereby, a memory array of the ceramic bits firmly tacked to the substrate by fine particles of the inorganic constituent.

The memory bits in the array thus produced is shown to exhibit the same properties as when tested individually, which indicates that the bits are not contaminated during formation and attachment on the substrate. The process of the present invention is amenable to the preparation of arrays of ceramic material of any suitable composition; those which are disclosed herein are presented merely by way of illustrating the wide utility of the invention.

The support or substrate must be capable of withstanding elevated firing temperatures. Any ceramic plate which is non-reactive with the ferrite itself may be used. The ceramics $Mn_{2.8}Ti_{0.1}Fe_{0.1}O_4$ and $Mn_{2.0}Ti_{0.1}Al_{0.9}O_4$ are quite suitable.

Inert substrates such as platinum or palladium may be used as well.

As illustrated particularly in FIGURE 1, the process steps of the present invention include providing a substrate 1 with layers of a parting sand 2 in the desired configuration of the memory bit in the array. The sand may be applied through a fine silk screen 3 which is approximately masked with a sheet of plastic 4. The parting or separating sand composition, as shown in FIGURE 1*a*, has predominantly volatile organic constituents 5 and a small percentage of a non-volatile inorganic material 6, such as a ferrite of the same compositon as the memory bits themselves. A suitable separating sand composition is the following:

| | Grams |
|---|---|
| Carbon black (Fisher G)—(carbon) | 2.5 |
| Ethocel (Dow 50 cps.)—(ethyl cellulose) | 1.25 |
| Pine Oil (Fisher)—(liquid resins) | 23.75 |
| Varnish (G. E. 1201)—(binder) | 2.0 |
| Ferrite ($Fe_{1.68}Mn_{1.25}Ni_{0\cdot03}O_4$)—(calcined and milled at 850°) (inorganic) | 0.1 |

Preferably the inorganic constituent should constitute about 1% or less by weight of the total sand composition.

As shown in FIGURE 2, the ferrite bits 7 are then applied atop the parting sand. Several methods have been used for applying the ferrite, including spraying, ruling and dipping. A particularly advantageous method involves the formation of a decalcomania of the ferrite. Accordingly a glass slide is coated with a 2 percent gelatin-water solution and dried. The thus treated glass slide then is dipped into a solution of 3 grams of ethyl cellulose, such as that product sold by the Dow Chemical Company under the trade name of "Ethocel" (cps. 50 viscosity), and 40 grams of pine oil and dried. A ferrite ink containing the memory ferrite material in a suitable binder is then silk screened onto the glass side in the form of the bits of the resultant memory array. The slide is dried again and dipped in water whereupon the gelatin dissolves and the ferrite bits float off in the form of the decal. A typical ferrite ink formulation consists of 43 grams of the ferrite, 40 grams of pine oil and 3 grams of ethyl cellulose. This formula may be used effectively with a 160 mesh screen to provide a bit area of 0.2 inch by 0.02 inch and a thickness of about 0.5 mil.

The decal thus produced is placed over the separating sand and held in place with water or an adhesive. The structure is then ready for firing. Initially it is heated slowly to 500° C. in air to drive off the binder constituents. Then the temperature is raised to 900° whereupon the carbon constituent of the separating sand burns off leaving only widely separated sintered particles of inorganic material to tack the ferrite bits in place on the substrate. These particles effectively bond the ferrite to the substrate but in the process do not contaminate the ferrites. (See FIGURE 3.) The final firing takes place at about 1400° C. in air for 15 minutes to several hours, suitably for about an hour.

This two-step oxidation described effectively controls the rate of oxidation of the entire sand composition, thereby preventing the sand from running over the entire substrate area. Thus at no time during the firing are the ferrite bits themselves permitted to touch the substrate.

A modification of the method of the present invention is illustrated in FIGURES 4–7. In particular there is shown a method of producing ceramic arrays composed of tubular elements. The method is similar to that described above. The differences lie in the use of two similar hemispherical grooved substrates 8 (see FIGURE 4) which are placed above each other to form a circular substrate. The parting sand 2 and the decal containing the ferrite is positioned therebetween (see FIGURE 7). During the final sintering the decal halves cement together to produce a tubular element which is held in place on the circular substrate by the fine particles of the sintered inorganic material originally present in the parting sand layer.

Some of the compounds which have been used in the method of the present invention include chromium-manganese ferrites, magnesium-manganese ferrites, and yttrium-iron garnets.

A particularly advantageous feature of the method of the present invention is that it produces arrays composed of uncontaminated high speed, open flux path memory bits. For example, such properties of the ferrite element as squareness of the hysteresis loop, coercive force and switching constants are quite dentical when it is present as a member of the array. This behavior results from the fact that only a small quantity of inorganic sand constituent is used to bond the magnetic material to the substrate.

The memory arrays shown herein may be provided with various write, read and sense windings, as are required in one of the several memory selection schemes known in the art. The windings may be applied by printed circuit techniques or otherwise as desired.

What has been described herein is a method for producing memory arrays composed of bistable high speed, open flux path magnetic elements. The method is also capable, in general, of producing an array of individual elements of any ceramic material firmly tacked to a substrate member.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory element comprising:
a substrate;
a body of ferrite material bonded to said substrate;
said body of ferrite material being formed of particles of ferrite material sintered together;
said body having a first section and a second section;
said first section of said ferrite body contacting said substrate and bonding said body to said substrate;
said second section being separated from said subtrate by said first section;
said first section having a particle density much less than the particle density in said second section with spaces between the patricles to form bonding connections to said substrate only at spaced points along said substrate.

2. A magnetic memory element comprising:
(a) a substrate
(b) a first layer of inorganic particles on said substrate;
(c) a second layer of ferrite particles on said first layer;
(d) the particles in said second layer being sintered together to form a continuous ferrite body exhibiting storage properties and being bonded to said substrate by said particles in said first layer;
(e) the particles in said first layer having a density appreciably less than the particles in said first layer and having spaces therebetween to form bonding connections to said ferrite body and said substrate only at spaced points along said substrate and said first body.

3. The memory element of claim 2 wherein said particles in said first layer are ferrite particles having the same composition as the particles in said second layer.

References Cited by the Examiner

UNITED STATES PATENTS

| | | | |
|---|---|---|---|
| 2,771,969 | 11/1956 | Brownlow | 189—36.5 |
| 2,988,668 | 6/1961 | Lincoln et al. | 29—155.5 |
| 3,019,125 | 1/1962 | Eggenberger et al. | 340—174 |

TERRELL W. FEARS, *Primary Examiner.*

IRVING L. SRAGOW, *Examiner.*

M. K. KIRK, G. LIEBERSTEIN, *Assistant Examiners.*